United States Patent [19]

Baskaran et al.

[11] Patent Number: 5,766,784
[45] Date of Patent: Jun. 16, 1998

[54] THIN FILMS AND USES

[75] Inventors: Suresh Baskaran; Gordon L. Graff, both of Kennewick; Lin Song, Richland, all of Wash.

[73] Assignee: Battelle Memorial Institute, Richland, Wash.

[21] Appl. No.: 630,022

[22] Filed: Apr. 8, 1996

[51] Int. Cl.$^6$ .................................................. C01G 23/047
[52] U.S. Cl. ........................ 428/702; 423/610; 427/419.2
[58] Field of Search ..................... 423/610; 427/419.2; 428/702

[56] References Cited

U.S. PATENT DOCUMENTS

| | | | |
|---|---|---|---|
| 3,650,815 | 3/1972 | Ghoshtogore | 423/610 |
| 4,166,876 | 9/1979 | Chiba | 428/702 |
| 4,483,694 | 11/1984 | Takamura et al. | 55/158 |
| 4,599,157 | 7/1986 | Suzuki et al. | 204/192 |
| 4,735,869 | 4/1988 | Morita | 428/702 |
| 5,225,382 | 7/1993 | Mizuno | 423/610 |
| 5,342,701 | 8/1994 | Miremadi | 428/702 |
| 5,352,485 | 10/1994 | DeGuire et al. | 427/266 |
| 5,447,803 | 9/1995 | Nagaoka | 428/702 |
| 5,595,813 | 1/1997 | Ogawa | 428/702 |
| 5,652,046 | 7/1997 | Beaufays | 428/702 |

FOREIGN PATENT DOCUMENTS

| | | | |
|---|---|---|---|
| WO 91/17286 | 11/1991 | WIPO | C23C 18/12 |

OTHER PUBLICATIONS

Rieke, P.C; Bentjen, S.B.; *Depositing of Cadmium Sulfide Film by Decompositioning of Thiourea in basic solution;* Chemistry of Materials (1993).

C.J. Brinker; *Transformation of Organometallics in to Common and Exotic Materials: Design and Activation,* edited by R.M. Laine (Martinus Nijhoff, 1988).

Bunker et al..; *Ceramic Thin–Film Formation on Functionalized Interfaces through Biomimetic Processing,* (Science, 264, 48–55, 1994).

Rieke, P.C.; *Nucleation and growth of calcium carbohydrates crystals on surface modified polyethylene polystyrene.* Materials Research (1988 p. 43).

Rieke, P.C., et al.; *Spatially Resolve Mineral Deposition on Patterned Self–Assemble Monolayers;* Langmuir 1994, 10, 619–622.

H. Shin, et al.; Synthesis and Characterization of $TiO_2$ thin films on organic self–assembled monolayers: Part I. Film formation form aqueous solutions; *J. Mater Res.,* vol. 10, No. 3, 692–698, Mar. 1995; Materials Research Society (1995).

(Biomimetic Thin–Film Synthesis); *SupraMocular Architecture,* Synthesis control in thin film and solids; Thomas Bein, editor; American Chemical Society 1992, Chapter 6, pp. 62–75.

H. Shin, et al.; Synthesis and Characterization of TiO2 thin Films on organic self–assembled monolayers: Part II. film formation via an organometallic route; *J. Mater. Res.;* vol. 10, No. 3, 699–703, Mar. 1995; Materials Research Society (1995).

Hyunjung shin, et al.; *Synthesis of $TiO_2$ Thin Films on Self–Assembled Organic Monolyers on Silicon;* Case Western Reserve University May, (1994).

*Primary Examiner*—Paul R. Michl
*Attorney, Agent, or Firm*—Martin L. McGregor

[57] ABSTRACT

The invention provides a method for synthesizing a titanium oxide-containing film comprising the following steps:

(a) preparing an aqueous solution of a titanium chelate with a titanium molarity in the range of 0.01M to 0.6M.

(b) immersing a substrate in the prepared solution, (c) decomposing the titanium chelate to deposit a film on the substrate.

The titanium chelate maybe decomposed acid, base, temperature or other means. A preferred method provides for the deposit of adherent titanium oxide films from C2 to C5 hydroxy carboxylic acids. In another aspect the invention is a novel article of manufacture having a titanium coating which protects the substrate against ultraviolet damage. In another aspect the invention provides novel semipermeable gas separation membranes, and a method for producing them.

110 Claims, 8 Drawing Sheets

FILM THICKNESS BY SOLUTION TEMPERATURE

TITANIUM CONCENTRATION AND FILM THICKNESS

TRANSMISSION PROPERTIES OF
TITANIUM OXIDE FILMS ON POLYCARBONATE

THIN FILMS AND USES

TECHNICAL FIELD

The present invent ion relates to the deposit of thin films from solution onto substrates. Specifically formation of thin titanium oxide films by decomposition of titanium chelates to produce novel protective layers and novel membranes having selective gas permeability.

BACKGROUND OF THE INVENTION

The ability to deposit a thin film of material is important in many application areas. Thin film deposition is essential for the production of semiconductors, magnetic film, electrochemical sensors, electro-optical devices, catalysts, ion exchange devices as well as the production of abrasion and corrosion resistant coatings. See, for example, K. L. Chopra and I. Kaur, *Thin Film Device Applications* (Plenum Press, NY, 1983) and C. J. Brinker in *Transformation of Organometallics into Common and Exotic Materials: Design and Activation*, edited by R. M. Laine (Martinus Nijhoff, 1988).

Current thin film preparation techniques involve either the use of liquid solutions or suspensions, precipitation from the gas phase, or vacuum deposition. Liquid solution methods involve the homogeneous precipitation of colloidal particles or gel solutions that are then cast as films onto a surface. Liquid solution methods include both electroless and electrodeposition, spray pyrolysis, colloidal particle systems, and polymeric sol-gel solutions, and crystal film growth on specially prepared surfaces. Unfortunately these methods often result in films of low density, whose microstructures are poorly controlled. Thin films produced by liquid solution methods also suffer shrinkage and cracking during drying, crystallization and sintering. Gas phase methods include physical vapor deposition by sputtering, evaporation, molecular beam epitaxy and chemical vapor deposition. These technologies involve the direct growth of materials by heterogeneous nucleation from the gas phase. While gas phase methods can result in dense films with ultra fine microstructure, they require high temperatures at the source, and vacuum thus limiting processing choices. Gas phase methods involve the use of very complicated reactions which have limited application. Gas phase methods require expensive equipment and complicated processes.

The deposition of thin films from solution at moderate temperatures is disclosed by Tarasevich and Rieke, published PCT application WO 91/17286. Tarasevich and Rieke suggest a general method for growing films on a prepared surface. Specifically a method is described in which a surface is chemically modified to produce the formation of surface functional sites that act as nucleation sites for the growth of crystallites. A second material is then deposited onto the chemically modified underlying substrate. The thin film is connected to the underlying substrate by binding to the functional sites. It is taught that the arrangement and type of these functional sites allows control of the deposition of the second material.

Thin films grown from solution by biomimetic processes are described by Bunker et al., *Ceramic Thin-Film Formation on Functionalized Interfaces through Biomimetic Processing*, (Science, 264, 48–55, 1994). This reference focuses on the use of biological systems as a guide to production of ceramic coatings on a variety of substrates and teaches formation of films from solution by the generation of nucleation sites on the surface that are suitable for crystalline growth under the proper conditions.

U.S. Pat. No. 5,352,485 to DeGuire et al. addresses the deposition of metal containing oxide films onto organic templates commonly referred to as self assembled monolayers (SAMs). In this method the SAM contains terminal functional groups chosen to induce the formation of oxide layers locally on the organic layer. Again these nucleation sites on the SAM influence and control the formation and deposition of the thin layer.

U.S. Pat. No. 4,599,157 to Suzuki et al. describes a composite membrane having a thin layer containing a metallic oxide in a carbon matrix film and teaches a method for manufacturing an oxygen gas permeable composite membrane comprising the step of forming a thin layer on a porous membrane by a reactive sputtering treatment, wherein the sputter source is a metallic oxide.

U.S. Pat. No. 4,483,694 to Takamura et al. describes an oxygen gas permselective membrane which comprises a film consisting essentially of a water-containable or wettable metallic oxide. The art has not provided a solution coating technology wherein crystalline, adherent metal oxide films, especially titanium films, can be deposited from solution at relatively modest temperatures on to hydrophobic surfaces such as polyethylene without prior surface modification.

SUMMARY OF THE INVENTION

The present invention provides a method for producing a titanium oxide film comprising (a) preparing an aqueous solution of a titanium chelate with a titanium molarity in the range of about 0.01M to about 0.6M and pH in the range of about 1 to about 3 and (b) immersing a substrate in the aqueous titanium chelate solution for a time sufficient to produce an adherent titanium oxide film on the substrate surface.

A preferred method further comprises an aqueous solution having a titanium molarity in the range of 0.001 to 10.0M, more preferably 0.0075 to 2.0M most preferably 0.01 to 0.6M. The titanium chelate is combined or contacted with an acid, preferably hydrochloric, although any strong acid may be used. The acid normality and the ratio of acid normality to titanium molarity must be in the range of about 3:1 to about 1:1 preferably about 2.5:1 to about 1.5:1 and most preferably about 2:1. Alternatively the acid to titanium ratio is 3:1 to 1:1, or 2.5:1 to 1.5:1 or 2:1. The film may be formed over a wide range of temperatures depending on the stability of the chelate, the strength of the acid or base selected and the desired film formation rate, provided however that the aqueous solution is maintained in a liquid state. In a particularly preferred embodiment, the temperature is maintained above 100 degrees and pressure is applied to prevent boiling. However the method is operable at lower temperatures and is especially efficient in the range of 20 degrees C. to 100 degrees C., preferably around about 70 degrees C. The method is especially rapid and many useful articles can be produced with immersion completed in less than about 10 minutes.

In a preferred method the pH is in the range of at or about 1.5 to at or about 2.5, preferably, in the range of at or about 1.75 to at or about 2.25 most preferably at or about 2.0. In an especially preferred embodiment, the invention provides a method for providing an adherent titanium containing coating to a substrate having at least one surface, comprising immersing the substrate in an aqueous solution of 0.01 to about 0.6M titanium and maintaining an acid normality to titanium molarity ratio in the range of at or about 1:1 to at or about 3:1, better, at or about 2.5 to 1.5 best, at or about 2.0 to 1.0. The ratio is maintained by adding acid or titanium, or both during the immersion step. This may be done automatically by monitoring one or both concentrations and adding reagent to replenish the concentration from an automatic metering valve. Alternatively, the rate of removal maybe computed and reagents supplied at a steady rate to maintain the desired concentration and ratios. The previously stated ranges and embodiments may also be combined with this embodiment of the method. This embodiment is preferred where a relatively thick film is desired while the previous "batch" method is preferred if a specific reproducible thickness is desired.

In contrast to the prior art solution deposition processes, nucleation sites need not be provided on the substrate surface. However under certain conditions it is desirable to have active nucleation sites on the surface. Some suitable substrates such as polysulfone films require no surface activation, while others such as polycarbonate display superior films when pretreated to enhance the surface site nucleation activity. Nucleation sites are usually provided on the substrate surface by pretreatment of the surface prior to the step of immersion in the aqueous solution of titanium. In some cases, nucleation sites are provided on the substrate surface by pretreatment of the surface during the step of immersion in the aqueous solution of titanium.

The invention provides a novel and useful article of manufacture which comprises a substrate having a surface with a solution deposited titanium oxide layer bonded to the surface, the titanium oxide layer having been obtained from a titanium chelate solution. The article of manufacture may comprise a substrate having a surface with active nucleation sites and a solution deposited titanium chelate derived layer bonded to the surface nucleation sites. The active sites may be introduced to the substrate surface by modification of the surface before the titanium oxide layer was bonded to the surface, by treatment of the surface as described in detail below. The article of manufacture may comprise a self assembling monolayer positioned between the substrate surface and the bonded titanium oxide layer. Especially preferred substrates are polycarbonate and polysulfone.

When the substrate is polysulfone or other suitable gas permeable membrane, the invention provides a method for increasing gas diffusion selectivity of a semipermeable membrane. When a membrane is treated as described above, a titanium containing film grown on the membrane surfaces in a thin film is effective to increase the selectivity for at least one gas over at least one other gas, as for example passing oxygen more rapidly than water vapor. Thus the invention provides a method for increasing the selectivity of membranes that pass gases at differential rates which comprises: (a) preparing an aqueous solution of a titanium chelate with a titanium molarity in the range of 0.01M to 0.6M and pH in the range of about 1.5 to about 2.5 (b) immersing the substrate in the prepared solution maintained in a liquid state. The aqueous solution further comprises a titanium molarity and an acid normality and the ratio of acid normality to titanium molarity is in the range of about 3:1 to about 1:1, preferably 2.5:1 to 1.5:1, most preferably at or about 2.0:1.0.

The preferred titanium chelates comprise organic compounds of 2 to 10 carbons, straight or branched chain, with at least two functional groups that bind titanium. An organic moiety selected from the group consisting of C2 to C 10 dicarboxylic acids, C2 to C10 hydroxy carboxylic acids, C2 to C10 amino acids, C2 to C10 sulfuryl carboxylic acids is preferred. Especially preferred are organic acids having at least two functional groups, as for example C2 to C 10 hydroxy carboxylic acids, preferably C2 to C5 hydroxy carboxylic acids most preferably lactic acid. The best mode known to the inventors is the use of compounds which include the dihydroxybis[2-hydroxypropanoato(2-)-$O^1, O^2$] titanate(IV) moiety.

In its broad aspect, the invention provides a method for synthesizing a titanium oxide-containing film comprising the following steps:
(a) preparing an aqueous solution of a titanium chelate with a titanium molarity in the range of about 0.01N to 0.6N.
(b) immersing a substrate in the prepared solution,
(c) decomposing the titanium chelate to deposit a film on the substrate.

The titanium chelate may be decomposed by acid or base, or other means. Acid decomposition conditions are generally as set out above. In addition useful films may be produced by decomposition of the chelate under basic conditions, with the same ratios and temperatures preferred for acids as set out above. In the base reactions the preferred pH is in the range of at or about 7.5 to at or about 10.5, preferably at or about 8.5 to at or about 9.5, most preferably at or about 9.0.

In contrast to the prior art methods, a useful titanium film can be grown by the present invention without surface pretreatment and the surface need not provide nucleation sites. The substrate may be a polymeric material, including either hydrophillic materials or hydrophobic materials. Films have been grown on surfaces ranging from polycarbonate and polysulfone to polyethylene and polytetraflouroethylene. The method is also applicable to an inorganic substrate. Materials, preferably inorganic substrates, may be treated with a self assembling monolayer forming substance to provide a modified surface. Especially preferred inorganic substrates include glass, ceramic, metal or semiconductors. The film may be subsequently heated to pyrolyze the organic monolayer and yield a titanium-oxide containing film.

The articles of manufacture provided by the invention comprise a film that selectively blocks radiation in the ultraviolet range. The films are useful in preventing damage to substrates and reducing undesired ultraviolet wavelengths. The layers provided by the invention may also be configured to block infrared or microwave radiation by techniques known in the art. When configured with a transparent material such as polycarbonate, the articles will block ultraviolet radiation while passing visible light. The hard surface may also provide scratch resistant coatings for lenses and the like.

On a suitable substrate the invention also unexpectedly acts as a gas-separation membrane by allowing selective permeation of one gas over another. For example on polysulfone film selective permeation of oxygen over water vapor is increased by four fold. The invention provides a novel method for preventing ultraviolet radiation damage to a substrate which comprises depositing of a titanium containing layer on the substrate by the methods set out above.

BRIEF DESCRIPTION OF THE DRAWINGS

The drawings are included merely to illustrate certain aspects of the present invention.

DETAILED DESCRIPTION OF THE INVENTION

Definitions

Figure 1:
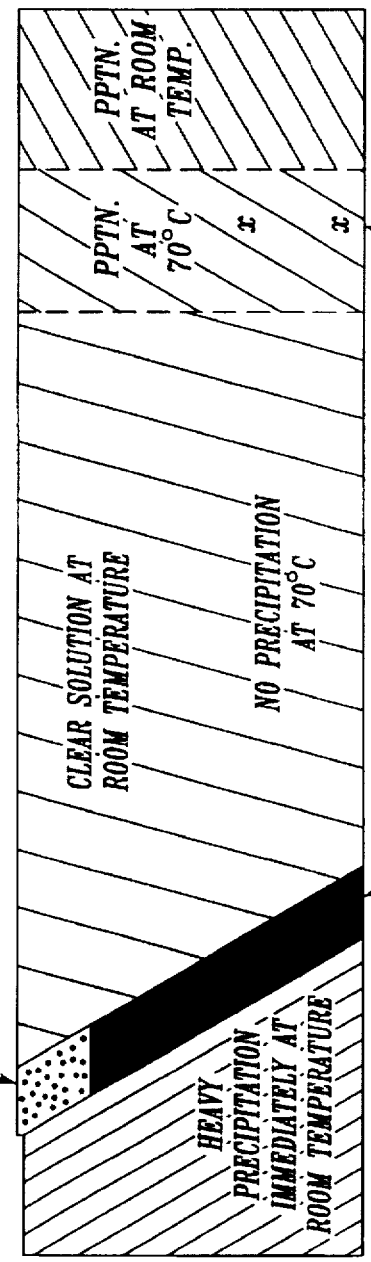
FIG. 1 shows conditions for titanium oxide film formation under acid and base regimes.

A titanium chelate means a titanium ion associated with a ligand which complexes with titanium by binding at least two atoms of the ligand with titanium to form a complex. The titanium atom may also bind additional ligands or have additional binding to the chelate ligand. In the most common cases chelation occurs when ligands form at least two coordinate-covalent bonds to bonding orbitals of a titanium ion to form a stable complex ion having at least one ring structure which includes the titanium and ligand atoms bonded together.

Ligand means an atom or group of atoms which form a stable complex with a metal atom or ion. Chelating ligands form at least two bonds to the metal.

An adherent film as used herein means that the film passes the tape tests of ASTM #D3359 (dry) and at 100% relative humidity according to ASTM #D2247.

A Self Assembling Monolayer ("SAM") is an assembly of chain like molecules having the ability to attach one end to a surface and form a monolayer film of oriented molecules having alignment generally perpendicular to the surface and having interactions among the molecules to form a discrete layer. Typically SAMs are formed using long chain hydrocarbons or protein molecules. The chain of a SAM molecule may be relatively short as in octadecylsilane derived SAMs or may be very long as in SAM's formed from groups of helically spiraled proteins. SAMs may be further treated to introduce functional groups or to crosslink the parallel chains after the monolayer has assembled itself.

"About" with regard to a quantity or range means plus or minus one standard deviation if the experimental precision is known, or plus or minus one half the next smaller increment if the precision is not known. For example about 1 means from 0.5 to 1.5 if the precision is unknown, while about 1.0 means 0.95 to 1.05. If the precision is know to be plus or minus 0.2 then about 1 means 0.8 to 1.2.

Synthesis of Titanium Films

In preparing to synthesize titanium oxide films in accordance with the present invention a 2.23M stock solution (pH 7.9) of a commercially available titanium chelate, the diammonium salt of titanium lactate ($(NH_4)_2$ ($C_6H_{10}O_8Ti$—trade name Tyzor La Titanate, manufactured by DuPont, Inc., Wilmington, Del., and also available from Van Waters & Rogers, Inc.) was prepared. The stock solution was diluted at room temperature to prepare the required titanium solutions.

Self assembling monolayers SAMs were deposited on polished silicon (single crystal) wafers by cleaning the silicon surface with an air plasma and treating for 2 minutes in 0.1M KOH and 5 min in 0.1M $HNO_3$. The wafer is then placed for 1 hour in a 1% by weight solution of a self assembling monolayer ("SAM") generating substance such as octadecyltrichlorosilane in clean, dry hexane. For sulfonation examples a vinyl terminated trichlorosilane was used.

Sulfonation of vinyl terminated SAMs was accomplished by exposing the monolayer to vapors from fuming sulfuric acid for less than 1 min, resulting in the replacement of the vinyl (—$CH_2$=$CH_2$) termination group of the SAM with a sulfonic acid ($SO_3H$) end group.

General Methods for Results Illustrated in FIG. 1

Film growth was carried out on 0.5 inch×1.0 inch polished silicon wafers with functionalized SAMs. The silicon wafers were always placed with the polished side exposed to the selected solution. The thickness of all deposited films on SAMs were measured by ellipsometry using a Gaertner ellipsometer, which was calibrated for films on silicon.

FIG. 1 shows the narrow ranges of conditions for film formation, which were first observed grown on silicon substrates with sulfonated SAMs using the titanium chelate solution. From FIG. 1 it is clear that only a narrow set of conditions of acid and base ratios result in the successful deposition of titanium films from titanium chelate solutions.

In the acidic region, the dark gray region around the line with a negative slope shows a small set of conditions where adherent film growth occurred and much larger areas of conditions for bulk precipitation or no deposit. At high titanium molarity precipitation occurs and no film growth was measured at 70 degrees even with the preferred ratio of acid to titanium. In the base end, the region where spontaneous nucleation occurs at room temperature and the region where only precipitation occurs at 70° C. are shown as dashed vertical lines. Additional data points are expected to show that the positions of these lines are in fact inclined to the vertical, as with the acidic region. Less attention was given to charting film formation in the basic regime because of the exceptionally useful films formed in the acidic regime. However the data demonstrate that useful films were also obtained in a relatively narrow range of basic conditions.

Molarity ratios and pH requirements to obtain film formation using titanium chelate solutions.

The conditions, pH and molarity, for bulk precipitation and titanium film formation on sulfonated self-assembled monolayers (SAMs) on silicon were investigated at room-temperature (22° C.) and 70° C. in order to define the parameters necessary to obtain synthesis of titanium oxide films using titanium chelate solutions. Titanium chelate 2.23M stock solution was diluted at room temperature to prepare solutions with a range from 0.01M to 1M with respect to titanium, while controlling acid and base normality at a chosen level through the addition of calibrated acid and base solutions.

Table 1, below, presents data obtained using the acidic pH regime. It can be seen from this data that film growth is favored when the acid normality is controlled to approximately twice the molarity of titanium in the solution. Calibrated titrations with acid additions at room temperature confirmed the onset of precipitation when the added acid normality was approximately twice the titanium molarity. The preferred ratio results in the added acid normality being approximately equal to or slightly less than the ligand (illustrated by lactate) molarity in the chelate. Optimized solutions are at the threshold condition, with slow precipitation and film formation occurring at room temperature, and fast precipitation and film growth with higher solution temperatures. At 70° C., precipitation occurs immediately and rapidly, typically initiating near the surface of the solution in the small vials and propagating downwards with almost all precipitation and film growth completed in less than 10 minutes.

Calibrated titrations of the chelate against KOH solutions showed that precipitation occurs at room temperature when the added base solution normality is approximately twice the titanium molarity. This is equivalent to concentrations of added base solutions being approximately equal to the lactate ion or ammonium ion concentration. At slightly lower levels of added base normality, precipitation can occur at higher solution temperatures (70° C.). The amount of precipitate formed with the basic regime was significantly less than what was typically formed in the acidic regime. A few substrates in selected solutions showed evidence of film formation, although film thickness never exceeded (20 nm) 200 Å, as measured by ellipsometry. Data used to chart out the solution deposition conditions in the basic regime are presented in Table 2.

TABLE 1

Experimental Observations with Ti Chelate Solutions (Acidic pH regime)

| # | Ti Molarity | Normality (HCl acid) | pH | Precipitate | Film Growth (70° C.) |
|---|---|---|---|---|---|
| 1 | 0.4 | None | 7.7 | No (70° C.) | No |
| 2 | 0.05 | None | 6.9 | No (70° C.) | No |
| 3 | 0.05 | 0.01 | 4.5 | No (70° C.) | No |
| 4 | 0.05 | 0.05 | 3.2 | No (70° C.) | No |
| 5 | 0.05 | 0.08 |  | No (70° C.) | No |
| 6 | 0.05 | 0.095 | 2.3 | Yes (70° C.) | Yes |
| 7 | 0.05 | 0.1 |  | Yes (70° C.) | Yes |
| 8 | 0.05 | 1.0 | 2.0 | Yes (22° C.) | slight |
| 9 | 0.01 | 0.02 | 2.5 | Yes (70° C.) | Yes |
| 10 | 0.2 | 0.3 | 2.3 | No (70° C.) | No |
| 11 | 0.2 | 0.38 | 1.9 | Yes (70° C.) | Yes |
| 12 | 0.2 | 0.5 | 1.8 | Yes (70° C.) |  |
| 13 | 0.2 | 0.9 | 1.4 | Yes (22° C.) |  |
| 14 | 0.4 | 0.8 | 1.6 | Yes (70° C.) | Yes |
| 15 | 0.6 | 1.1 | 1.4 | Yes (70° C.) | Yes |
| 16 | 0.8 | 1.3 | 1.6 | Yes (70° C.) | No |
| 17 | 1.0 | 1.7 | 1.4 | Yes (70° C.) | No |
| 18 | 1.0 | 1.9 |  | Yes (20° C.) |  |

TABLE 2

Experimental Observations with Titanium Chelate Solutions (Basic pH Regime)

| # | Ti Molarity | Normality (Base) | pH | Precipitate | Film Growth (70° C.) |
|---|---|---|---|---|---|
| 1 | 0.01 |  | 9 | Yes (70° C.) | Yes |
| 2 | 0.01 |  | 11.6 | Yes (70° C.) |  |
| 3 | 0.01 |  | 13.3 | Yes (22° C.) |  |
| 4 | 0.05 | 0.005 | 7.0 | No (70° C.) |  |
| 5 | 0.05 | 0.007 | 7.4 | Yes (70° C.) | No |
| 6 | 0.05 | 0.03 | 8.6 | Yes (70° C.) |  |
| 7 | 0.05 |  | 9.0 | Yes (70° C.) | Yes |
| 8 | 0.05 | 0.07 | 9.2 | Yes (70° C.) |  |
| 9 | 0.05 | 0.1 | 11.3 | Yes (22° C.) |  |
| 10 | 0.1 |  | 8.0 | Yes (70° C.) |  |
| 11 | 0.1 |  | 9.0 | Yes (22° C.) |  |
| 12 | 0.1 |  | 10.0 | Yes (22° C.) |  |
| 13 | 0.1 |  | 11.3 | Yes (22° C.) |  |

Other Ligands for Chelates

The titanium chelate complex must be stable enough to provide controlled decomposition so as to sustain orderly crystal growth while avoiding bulk precipitation. Particularly preferred chelating agents are those which form a five or six membered ring structure when bonded to the titanium ion. Although illustrated here for acid or base mediated decompositions, the complex decomposition may also be mediated by thermal decomposition, radiation, or other means for triggering the release of titanium ions to the growing crystal latice. The following ligands may substituted for lactate in the preceding experiment, and may produce high quality films under substantially the same reaction conditions: C2 to C10 dicarboxylic acids, including substituted or unsubstituted, oxalic, malonic, succinic, glutaric, adipic, pimelic, suberic, azelaic, sebacic, malic, fumaric, phthalic, isophthalic, terephthalic, hemimellitic, trimellitic, trimesic, C2 to C10 substitued or unsubsed hydroxy acids such as: glycolytic, lactic, a-hydroxybutyric, mandelic, glyceric, malic, tartaric, mesotartaric, citric; substituted or unsubstituted, natural or synthetic amino acids including d, 1 or racemates of: alanine, arginine, asparagine, aspartic acid, cysteine, cystine, dibromotyrosine, diiodotyrosine, tyrosine, glutamic acid, glutamine, glycine, histidine, hydroxylysine, lysine, hydroxyproline, proline, isoleucine, leucine, lysine, methionine, phenylalanine, serine, threonine, tyrosine, valine. One or more hydrogens of the preceding acids may also be substituted with one or more hydrocarbon radicals, or halogens. In selecting a ligand the complex must be stable enough to maintain a slow release of titanium oxide precursor, but sufficiently labile to decompose to release titanium.

Effect of Temperature on Titanium Oxide Film Deposition

Figure 2:
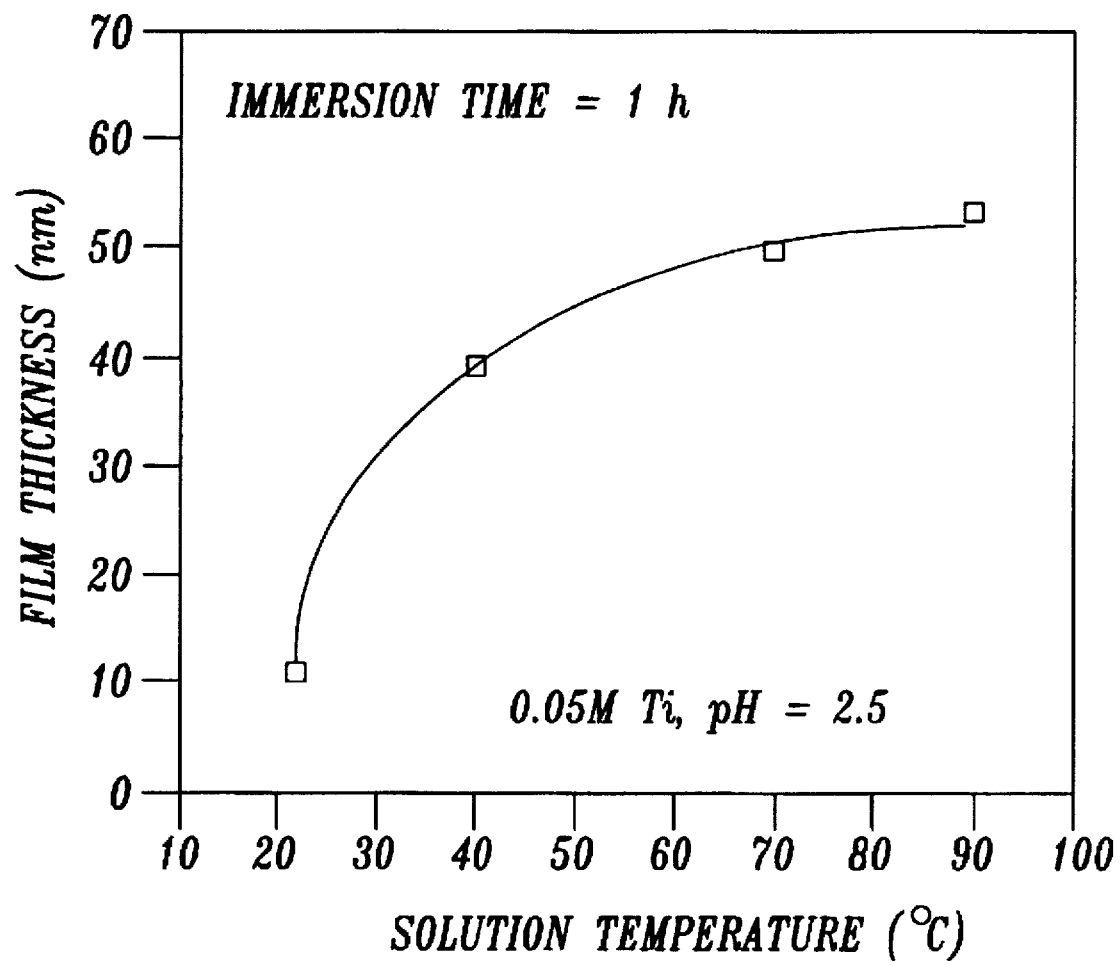
FIG. 2 is a graph showing film thickness by solution temperature.

The effect of temperature on film thickness was determined for solution conditions that had favored film formation at 70° C. in an experiment in which 0.05M titanium in a solution with a pH of 2.5 was used in a 1 hr immersion at 40° C. and 90° C. Results shown in FIG. 2 indicate that a significant improvement in film thickness can be obtained by raising the temperature of the deposition solution to 70° C., but that increases above 70° C. the specific conditions illustrated.

Effect of Titanium Concentration on Titanium Film Deposition

Figure 3:
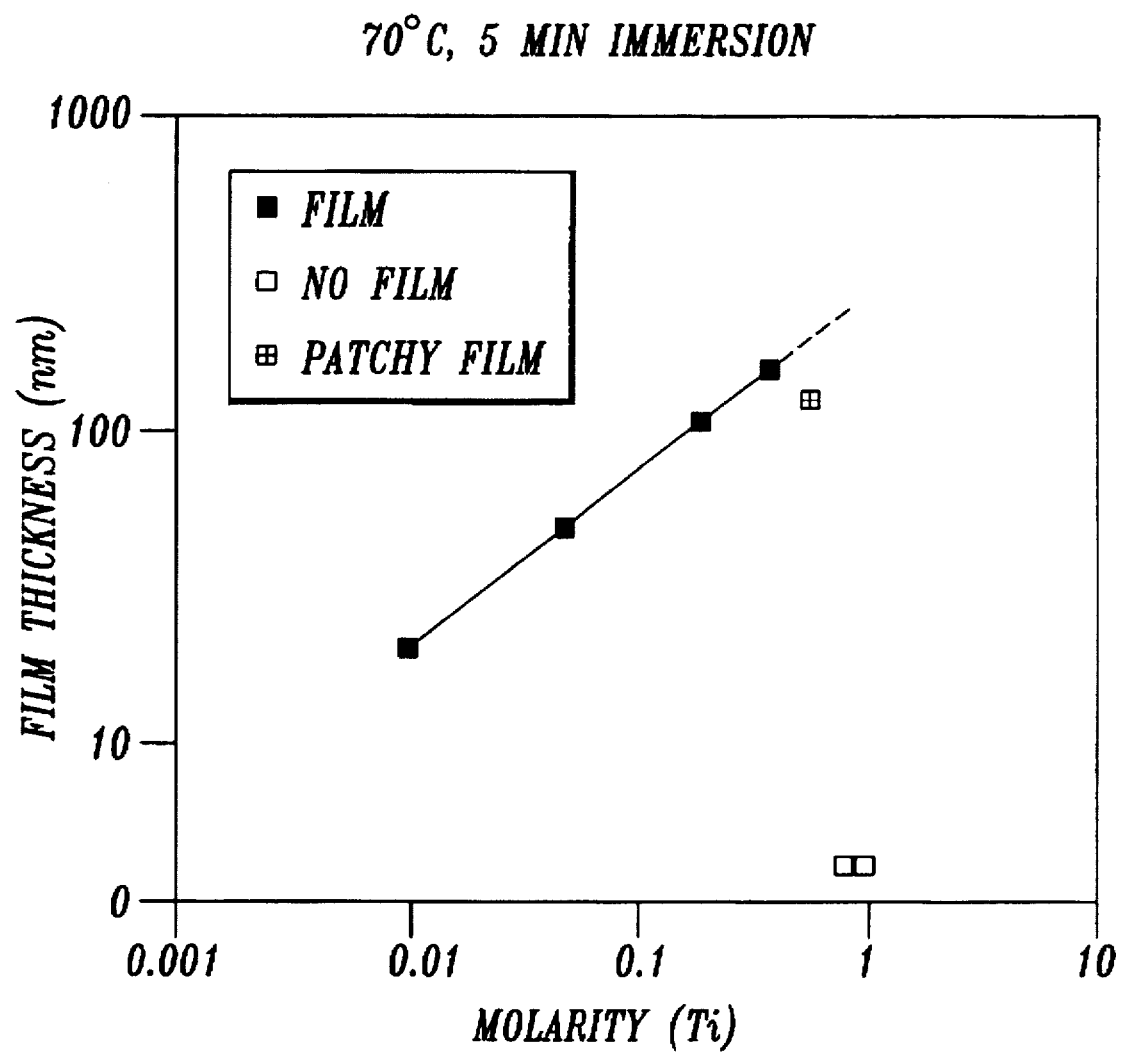
FIG. 3 is a graph showing titanium concentration and film thickness.

The effect of titanium concentration on the thickness of the film deposited was examined using a range of titanium concentrations, from 0.001M to 1.0M titanium solutions, with calibrated acid solution added in order to maintain the added acid normality at approximately 1.9 times the titanium molarity. It was found that increasing titanium concentrations approaching 1M, in the presence of a constant titanium: acid ratio, resulted in increased film thickness to a maximum of 150 nm under the conditions of a 5 min immersion at 70° C. However, higher concentrations of titanium in the solution, for example those in excess of 1M titanium resulted in spontaneous precipitation throughout the solution and no film thickness measurable by ellipsometry. The effect of titanium molarity on film thickness is illustrated in FIG. 3.

Effect of Repeated Immersion on Titanium Film Deposition

Figure 4:
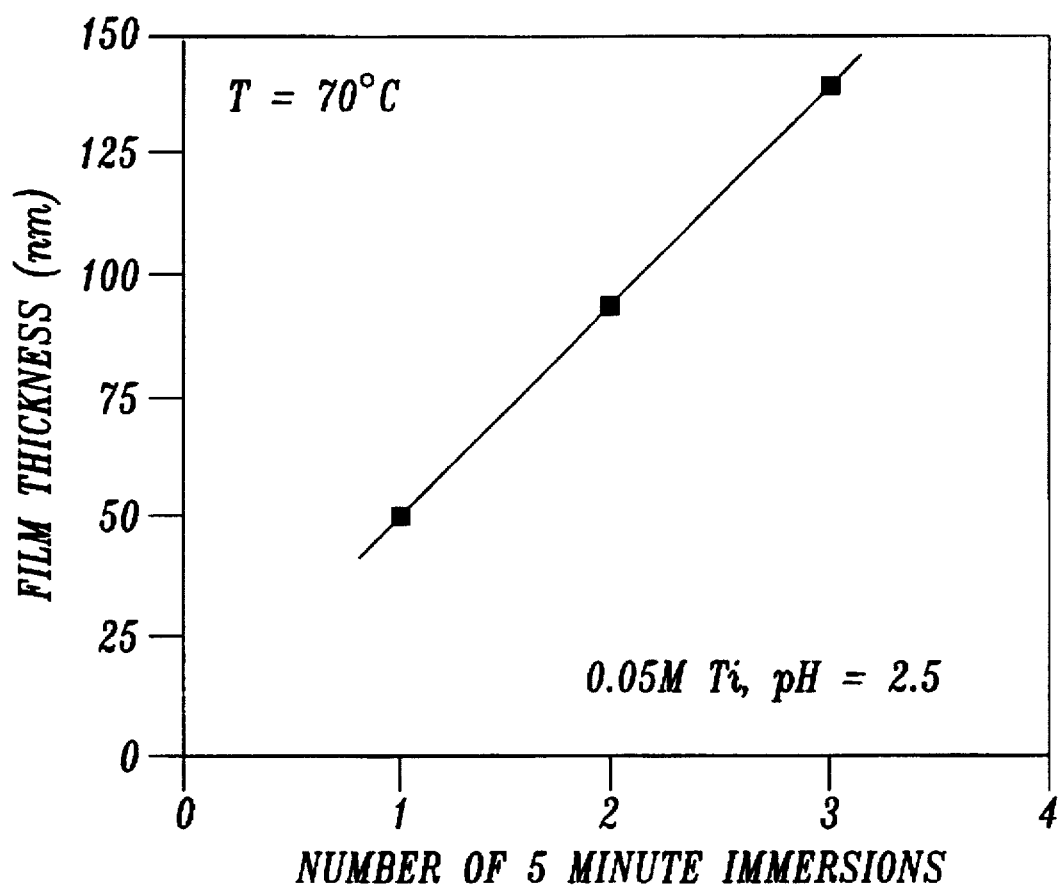
FIG. 4 is a graph showing results of repeated immersion on film thickness.

Repeated immersion of silicon wafers into fresh 0.05M titanium chelate solutions (pH 2.5) resulted in rapid deposition of thicker films. The first 5 min immersion and the two subsequent 5 min immersions in fresh solution resulted in equivalent film thickness increases of approximately 50 nm. After three immersions either no further film growth occurred or the film was too thick to be measured by the ellipsometer. Film deposition with repeated immersion using a 0.05M titanium solution in an acidic protocol is illustrated in FIG. 4.

Untreated Surface Examples

Figure 5:
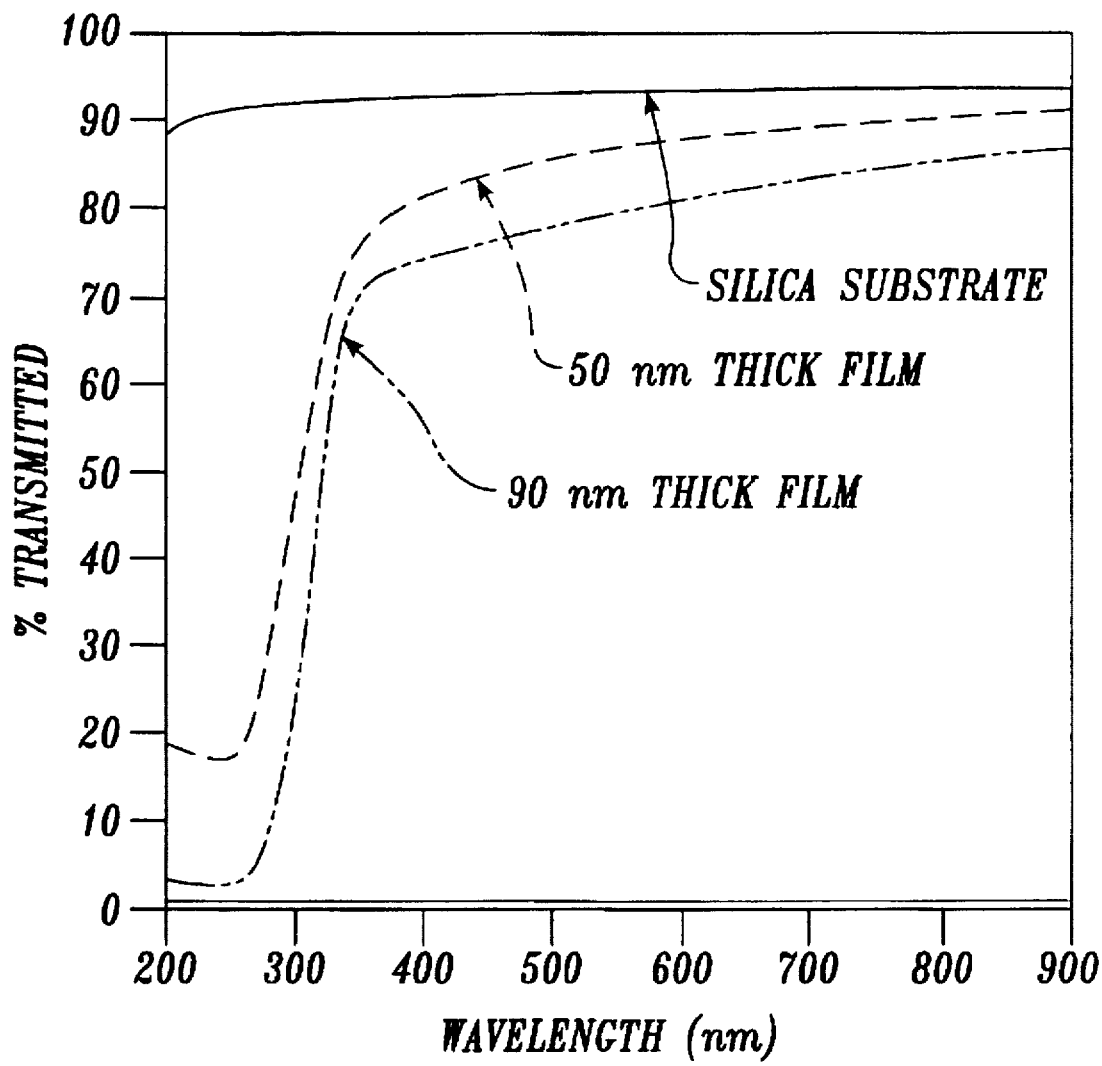
FIG. 5 is a graph showing transmission properties of titanium oxide films on fused silica
Figure 6:
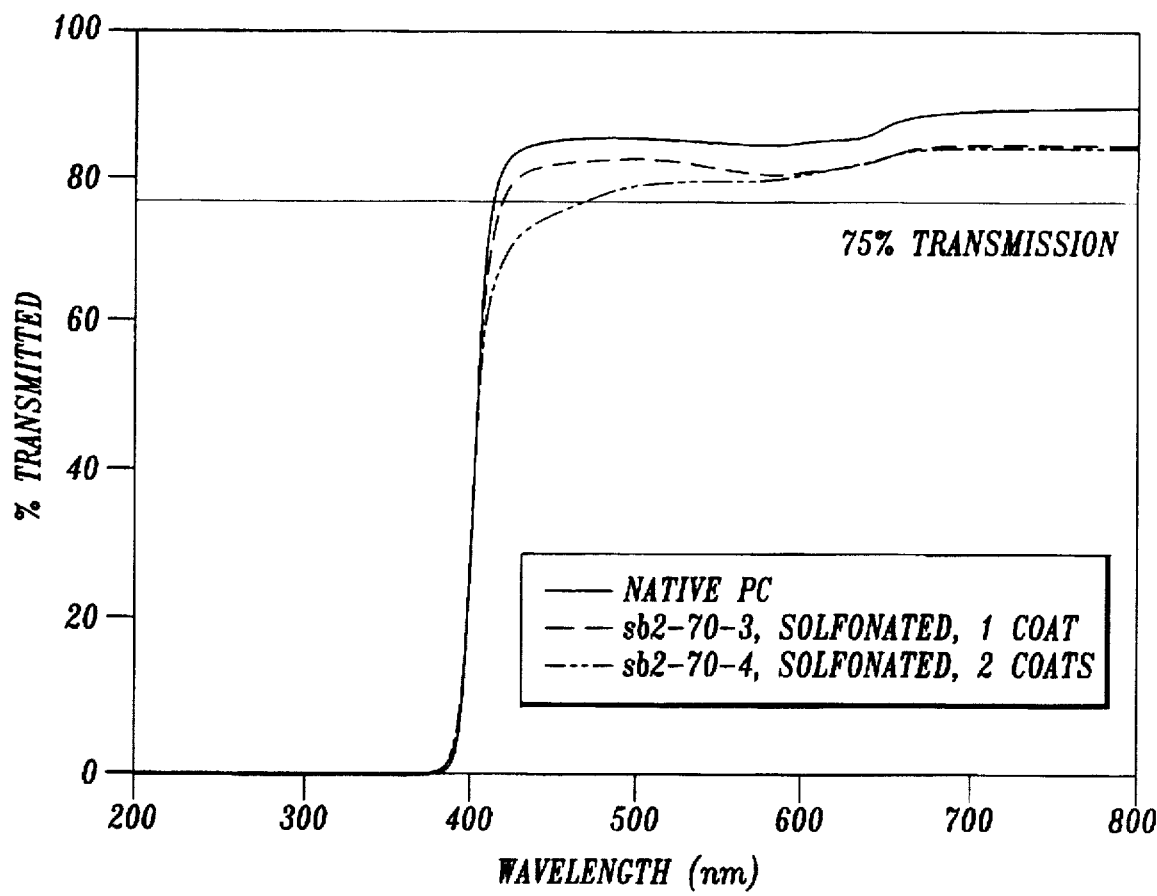
FIG. 6 is a graph showing transmission properties of titanium oxide films on polycarbonate.

Following the establishment of successful growth regimes for titanium oxidefilm deposition onto functionalized SAMs on silicon wafers using titanium chelate solutions, titanium oxide film deposition on other substrates was attempted. Alternative substrates included polycarbonate panels and polysulfone sheets to illustrate the ability of titanium chelate solutions to deposit titanium films on plastics with no surface pretreatment. In addition, titanium oxide films were deposited upon fused silica disks. The polycarbonate samples were a commercially available grade (Miles polycarbonate CTG 3123-1112) and the polysulfone sheet was a porous asymmetric membrane, approximately 0.1 mm thick, manufactured by Memtec, Inc. In the case of polycarbonate and fused silica, both unsulfonated and sulfonated samples were used to investigate film growth. When films were successfully applied on silica and polycarbonate the effect of titanium films on the transmission of visible light and absorption of UV light were determined using a UV-V is spectrophotometer (Model Cary 5, Varian Analytical Instruments). The results shown in FIG. 5 illustrate that the titanium oxide films deposited on silica discs absorb high levels of UV radiation in a thickness dependent fashion but allow the transmission of the majority of visible light. The results shown in FIG. 6 illustrate the same for titanium oxide film deposition on polycarbonate.

Films on Plastic Substrates

After determining film formation conditions with model silicon substrates, films were deposited on polycarbonate, polysulfone and fused silica. Optimum solutions in the acidic regime were used, with the deposition temperature usually at 70° C. Films were deposited on both unsulfonated and sulfonated polycarbonate panel surfaces. Unsulfonated sample preparation was an ethanol wash to clean the surface. Sulfonation did not alter the thickness of the deposited film, but film formation was more consistent with the sulfonated surfaces. Selected flat panel samples were also coated only on one side by doing the deposition with the panels resting on the surface of the solution. Film thickness on polycarbonate was approximately the same as the thickness obtained on SAMs with identical solutions. Using a 0.05M Ti solution, with added HCl concentration at 0.09M, film thickness after the ten minute precipitation at 70° C. was approximately 50 nm (500 Å). Films on SAMs and the polycarbonate were both brown in color.

Thin flexible polysulfone membranes were not given any treatment prior to deposition. These thin, porous membranes were placed in optimized, acidic titanium chelate solutions, and the precipitation carried out at 70° C. After the deposition, coated membranes were dried and inspected by scanning electron microscopy. A conformal titanium oxide containing film was formed on the surface, with through-thickness cracks also evident in the coating throughout the surface. Microchemical analysis by energy dispersive spectrometry showed that titania was present in the porous polymer membrane to depths of many tens of microns, indicating that deposition of titanium oxide occurs on internal pore surfaces of the organic membrane.

The deposition of titanium oxide thin films on polycarbonate and polysulfone was done either in polyethylene or Teflon (polytetrafluoroethylene) containers. Surprisingly it was found that the internal bottom surfaces of these containers were also coated by the deposition process. These containers had not received any pretreatment, yet films were deposited on the internal surfaces. Interference colors from these films were evident indicating thickness over 50 nm (500 Å).

Films on Glass

Films were also deposited on glass samples with two different surface treatments. As noted above, treatment of a fused silica disk included formation of a SAM, followed by sulfonation. The second treatment coated a standard glass microscope slide. The pretreatment was simple cleaning in ethanol for a few minutes. Films were deposited on both types of surfaces. With the acidic 0.05M titanium solution, the characteristic brown film was formed on the glass slide. No distinctive colors were apparent on the fused silica substrate.

Structure and Properties of Films

Figure 7:
FIG. 7 is a photomicrograph showing a titanium oxide film on polycarbonate.
Figure 8:
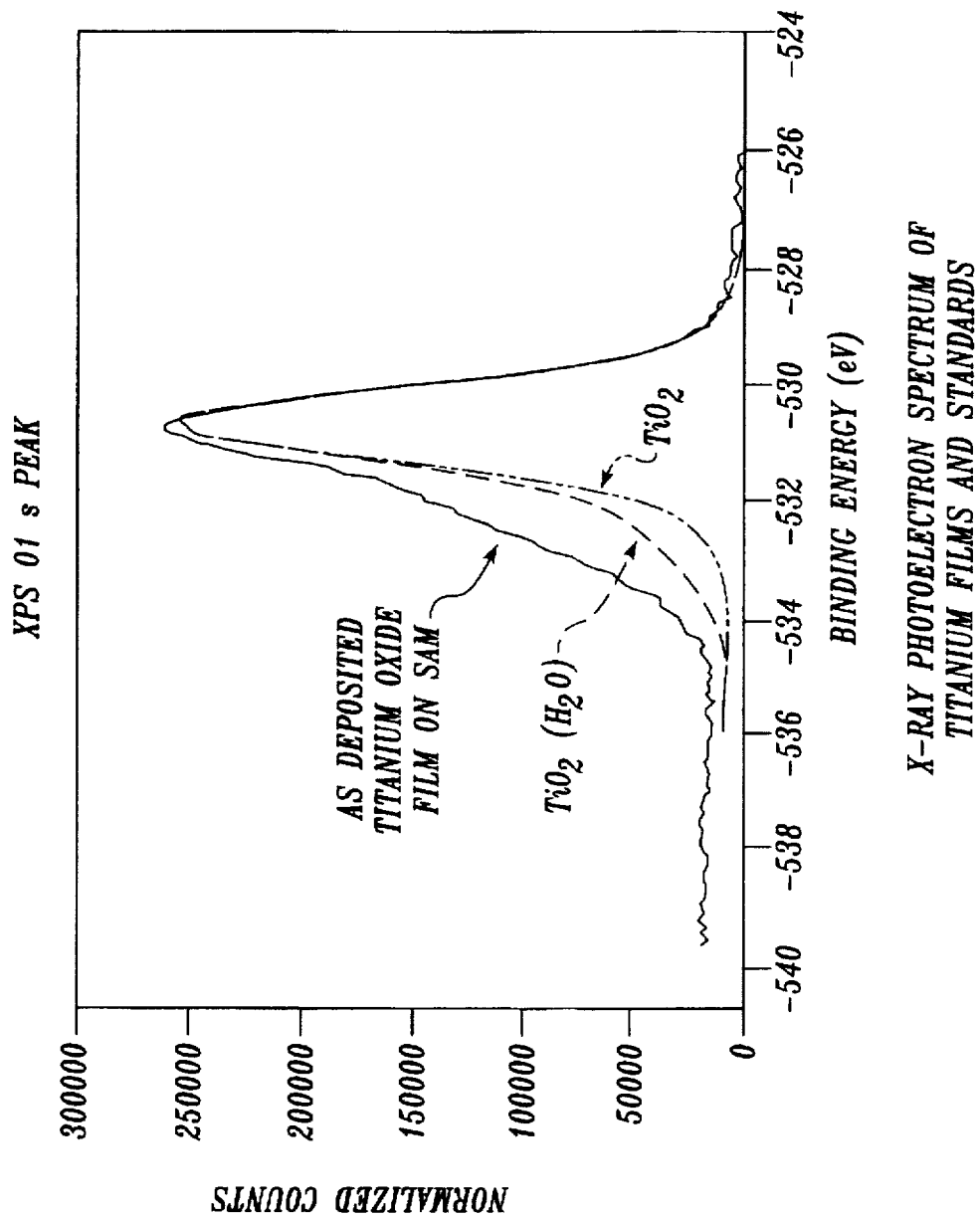
FIG. 8 is an x-ray photoelectron spectrum of a titanium oxide film.

The films formed on all the substrates were adherent, as the film passed the ASTM Tape Tests. The films deposited on polycarbonate were sectioned, and inspected by transmission electron microscopy (TEM). A TEM micrograph of the film on sulfonated polycarbonate is shown in FIG. 7. The film thickness is approximately 50 nm. The films were amorphous, with very diffuse diffraction rings evident in the TEM diffraction mode. X-ray photoelectron spectroscopy FIG. 8, indicated that films were hydrated titanium oxide, with a distinctive shoulder, indicative of O—H bonding, on the primary $O_{1s}$ (O—Ti) peak.

The preceeding experiments show that the titanium crystal films grow even on untreated hydrophobic surfaces such as polyethylene. These results stand in stark contrast to the prior art wherein surface modification was essential to growth of crystalline films.

The transmission properties of the titanium oxide films on fused silica are shown in FIG. 5. With a single coat using the acidic 0.05M Ti solution at 70° C., the transmission in the ultraviolet range from 200 to 300 nm cut to 20%. With a second coat using the same solution, coating thickness increases to ≈90 nm, and the UV transmission decreases to less than 3%. The transmission properties of these coatings on polycarbonate is shown in FIG. 6. Even with two consecutive coats and a total thickness of about 90 nm, the transmittance exceeds 75% in the visible wavelength range. This illustrates that titanium oxide coatings deposited from the titanium chelate solution can be effective UV blockers on plastic components, without degrading the visible transmittance. As noted above, other applications of titanium oxide coatings, either as exterior films or as internal coatings within porous structures, are in gas-separation.

We claim:

1. A method for producing a titanium oxide film comprising:
   (a) preparing an aqueous solution of a titanium chelate with a titanium molarity in the range of about 0.01M to about 0.6M and pH in the range of about 1 to about 3
   (b) immersing a substrate in the aqueous titanium chelate solution for a time sufficient to produce an adherent titanium oxide film on the substrate surface.

2. A method according to claim 1 wherein the aqueous solution further comprises a titanium molarity and an acid normality and the ratio of acid normality to titanium molarity is in the range of about 3:1 to about 1:1.

3. A method according to claim 2 wherein the ratio of acid normality to titanium molarity is about 2.5:1 to about 1.5:1.

4. A method according to claim 2 wherein the ratio of acid normality to titanium molarity is about 2:1.

5. A method according to claim 2 wherein the ratio of acid normality to titanium molarity is in the range of 3:1 to 1:1.

6. A method according to claim 5 wherein the ratio of acid normality to titanium molarity is 2.5:1 to 1.5:1.

7. A method according to claim 5 wherein the ratio of acid normality to titanium molarity is 2:1.

8. A method according to claim 1 wherein the aqueous solution is maintained in a liquid state.

9. A method of claim 1 wherein the temperature is maintained above 100 degrees and pressure is applied.

10. A method according to claim 1 wherein the aqueous solution is maintained in the range of 20 degrees C. to 100 degrees C.

11. A method according to claim 1 wherein the aqueous solution is maintained at about 70 degrees.

12. A method according to claim 1 wherein the immersion step is completed in less than about 10 minutes.

13. A method according to claim 1 wherein the pH is in the range of about 1.5 to about 2.5.

14. A method according to claim 1 wherein the pH is in the range of about 1.75 to about 2.25.

15. A method according to claim 1 wherein the pH is about 2.0.

16. A method according to claim 1 wherein the pH is in the range of 1.5 to 2.5.

17. A method according to claim 1 wherein the pH is in the range of 1.75 to 2.25.

18. A method according to claim 1 wherein the pH is 2.0.

19. A method for increasing gas diffusion selectivity of a semipermeable membrane which comprises treating the membrane according to the method of claim 1 to produce a titanium containing film on membrane surfaces in an amount effective to increase the selectivity for at least one gas over at least one other gas.

20. A method for increasing the selectivity of membranes that pass gases at differential rates which comprises:
   (a) preparing an aqueous solution of a titanium chelate with a titanium molarity in the range of 0.01M to 0.6M and pH in the range of about 1.5 to about 2.5
   (b) immersing the substrate in the prepared solution maintained in a liquid state.

21. A method according to claim 20 wherein the aqueous solution further comprises a titanium molarity and an acid normality and the ratio of acid normality to titanium molarity is in the range of about 3:1 to about 1:1.

22. A method according to claim 21 wherein the ratio of acid normality to titanium molarity is about 2.5:1 to about 1.5:1.

23. A method according to claim 21 wherein the ratio of acid normality to titanium molarity is about 2:1.

24. A method according to claim 21 wherein the ratio of acid normality to titanium molarity is in the range of 3:1 to 1:1.

25. A method according to claim 21 wherein the ratio of acid normality to titanium molarity is 2.5:1 to 1.5:1.

26. A method according to claim 21 wherein the ratio of acid normality to titanium molarity is 2:1.

27. A method according to claim 1 wherein the titanium chelate comprises an organic compound of 1 to 10 carbons, straight or branched chain, and at least two functional groups that bind titanium, capable of decomposition to release titanium oxide precursor for film formation.

28. A method according to claim 27 wherein the chelate further comprises an organic moiety selected from the group consisting of C2 to C10 dicarboxylic acids, C2 to C10 hydroxy carboxylic acids, and C2 to C10 amino acids.

29. A method according to claim 27 wherein the chelate further comprises an organic acid having at least two functional groups.

30. A method according to claim 27 wherein the chelate comprises C2 to C5 substituted carboxylic acids.

31. A method according to claim 27 wherein the chelate comprises C2 to C5 hydroxy carboxylic acids.

32. A method according to claim 1 wherein the chelate comprises lactic acid.

33. A method according to claim 1 wherein the chelate comprises a dihydroxybis[2-hydroxypropanoato(2-)-$O^1,O^2$] titanate(IV) moiety.

34. A method for synthesizing a titanium oxide-containing film comprising the following steps:
   (a) preparing an aqueous solution of a titanium chelate with a titanium normality in the range of 0.01M to 0.6M
   (b) immersing a substrate in the prepared solution.
   (c) decomposition of the titanium chelate to deposit a film on the substrate.

35. The method of claim 34 wherein the titanium chelate is decomposed by acid.

36. A method according to claim 35 wherein the aqueous solution further comprises a titanium molarity and an acid normality and the ratio of acid normality to titanium molarity is in the range of about 3:1 to about 1:1.

37. A method according to claim 35 wherein the ratio of acid normality to titanium molarity is about 2.5:1 to about 1.5:1.

38. A method according to claim 35 wherein the ratio of acid normality to titanium molarity is about 2:1.

39. A method according to claim 35 wherein the ratio of acid normality to titanium molarity is in the range of 3:1 to 1:1.

40. A method according to claim 35 wherein the ratio of acid normality to titanium molarity is 2.5:1 to 1.5:1.

41. A method according to claim 35 wherein the ratio of acid normality to titanium molarity is 2:1.

42. A method according to claim 35 wherein the aqueous solution is maintained in a liquid state.

43. A method of claim 35 wherein the temperature is maintained above 100 degrees and pressure is applied.

44. A method according to claim 35 wherein the aqueous solution is maintained in the range of 20 degrees C. to 100 degrees C.

45. A method according to claim 35 wherein the aqueous solution is maintained at about 70 degrees.

46. A method according to claim 35 wherein the immersion step is completed in less than about 10 minutes.

47. A method according to claim 35 wherein the pH is in the range of about 1.5 to about 2.5.

48. A method according to claim 35 wherein the pH is in the range of about 1.75 to about 2.25.

49. A method according to claim 35 wherein the pH is about 2.0.

50. A method according to claim 35 wherein the pH is in the range of 1.5 to 2.5.

51. A method according to claim 35 wherein the pH is in the range of 1.75 to 2.25.

52. A method according to claim 35 wherein the pH is 2.0.

53. The method of claim 34 wherein the titanium chelate is decomposed by base.

54. A method according to claim 53 wherein the aqueous solution further comprises a titanium molarity and an base normality and the ratio of base normality to titanium molarity is in the range of about 3:1 to about 1:1.

55. A method according to claim 53 wherein the ratio of base normality to titanium molarity is about 2.5:1 to about 1.5:1.

56. A method according to claim 53 wherein the ratio of base normality to titanium molarity is about 2:1.

57. A method according to claim 53 wherein the ratio of base normality to titanium molarity is in the range of 3:1 to 1:1.

58. A method according to claim 53 wherein the ratio of base normality to titanium molarity is 2.5:1 to 1.5:1.

59. A method according to claim 53 wherein the ratio of base normality to titanium molarity is 2:1.

60. A method according to claim 53 wherein the aqueous solution is maintained in a liquid state.

61. A method of claim 53 wherein the temperature is maintained above 100 degrees and pressure is applied.

62. A method according to claim 53 wherein the aqueous solution is maintained in the range of 20 degrees C. to 100 degrees C.

63. A method according to claim 53 wherein the aqueous solution is maintained at about 70 degrees.

64. A method according to claim 53 wherein the immersion step is completed in less than about 10 minutes.

65. A method according to claim 53 wherein the pH is in the range of about 7.5 to about 10.5.

66. A method according to claim 53 wherein the pH is in the range of about 8.5 to about 9.5.

67. A method according to claim 53 wherein the pH is about 9.0.

68. A method according to claim 53 wherein the pH is in the range of 7.5 to 10.5.

69. A method according to claim 53 wherein the pH is in the range of 8.5 to 9.5.

70. A method according to claim 53 wherein the pH is 9.0.

71. The method of claim 1 wherein the substrate is a polymeric material.

72. The method of claim 1 wherein the substrate is a polycarbonate.

73. The method of claim 20 wherein the substrate is a polymeric material.

74. The method of claim 20 wherein the substrate is a polysulfone.

75. The method of claim 34 wherein the substrate is a polymeric material.

76. The method of claim 34 wherein the substrate is a polycarbonate.

77. A method for synthesizing a titanium oxide-containing film on a inorganic substrate comprising the following steps:
   (a) preparing an aqueous solution of a titanium chelate,
   (b) immersing the treated substrate in the prepared solution maintained in a liquid state.

78. A method according to claim 77 which further comprises the step of treating the substrate with a self assembling monolayer forming substance.

79. A method according to claim 77 wherein the substrate is selected from the group consisting of glass, ceramic, metal or semiconductor.

80. The method of claim 78 wherein the film is subsequently heated to pyrolyze the organic monolayer and yield a titanium-oxide containing film.

81. The method of claim 79 wherein the film is subsequently heated to pyrolyze the organic monolayer, and also yield a titanium-oxide containing film.

82. An article of manufacture produced by the process of claim 34 wherein the substrate is a polysulfone and deposition of the film occurs on internal pore surfaces of the substrate and the film acts as a gas-separation membrane by increasing selective permeation of oxygen over water vapor.

83. A method according to claim 1 wherein the surface has active sites thereon.

84. A method according to claim 34 wherein the chelate comprises a dihydroxybis[2-hydroxypropanoato(2-)-$O^1,O^2$] titanate(IV)moiety.

85. A method according to claim 20 wherein the chelate comprises a dihydroxybis[2-hydroxypropanoato(2-)-$O^1,O^2$] titanate(IV)moiety.

86. A method according to claim 77 wherein the chelate comprises a dihydroxybis[2- hydroxypropanoato(2-)-$O^1$, $O^2$]titanate(IV)moiety.

87. A method for preventing ultraviolet radiation damage to a substrate which comprises depositing of a titanium containing layer on the substrate by the method of claim 1.

88. A method for preventing ultraviolet radiation damage to a substrate which comprises depositing a titanium containing layer on the substrate by the method of claim 34.

89. A method for preventing ultraviolet radiation damage to a substrate which comprises depositing a titanium containing layer on the substrate by the method of claim 35.

90. A method for preventing ultraviolet radiation damage to a substrate which comprises depositing of a titanium containing layer on substrate by the method of claim 53.

91. A method for preventing ultraviolet radiation damage to a substrate which comprises depositing a titanium containing layer on the substrate by the method of claim 72.

92. A method for preventing ultraviolet radiation damage to a substrate which comprises depositing a titanium containing layer on the substrate by the method of claim 76.

93. A method for preventing ultraviolet radiation damage to a substrate which comprises depositing a titanium containing layer on the substrate by the method of claim 77.

94. A method according to claim 1 wherein the titanium concentration is maintained by supplying additional titanium during the immersion step.

95. A method according to claim 4 wherein the titanium concentration is maintained by supplying additional titanium during the immersion step.

96. A method according to claim 15 wherein the titanium concentration is maintained by supplying additional titanium during the immersion step.

97. A method according to claim 19 wherein the titanium concentration is maintained by supplying additional titanium during the immersion step.

98. A method according to claim 20 wherein the titanium concentration is maintained by supplying additional titanium during the immersion step.

99. A method according to claim 34 wherein the titanium concentration is maintained by supplying additional titanium during the immersion step.

100. A method according to claim 77 wherein the titanium concentration is maintained by supplying additional titanium during the immersion step.

101. A method according to claim 1 wherein the acid concentration is maintained by supplying additional acid during the immersion step.

102. A method according to claim 20 wherein the acid concentration is maintained by supplying additional acid during the immersion step.

103. A method according to claim 34 wherein the acid concentration is maintained by supplying additional acid during the immersion step.

104. A method according to claim 77 wherein the acid concentration is maintained by supplying additional acid during the immersion step.

105. A method according to claim 1 wherein nucleation sites are provided on the substrate surface.

106. A method according to claim 105 wherein nucleation sites are provided on the substrate surface by pretreatment of the surface prior to the step of immersion in the aqueous solution of titanium.

107. A method according to claim 105 wherein nucleation sites are provided on the substrate surface by treatment of the surface during the step of immersion in the aqueous solution of titanium.

108. An article of manufacture, comprising:
   a porous substrate of an organic membrane having internal pore surfaces with a titanium oxide film on the internal pore surfaces.

109. The article as recited in claim 108, wherein the porous substrate is polysulfone.

110. The article as recited in claim 108, wherein a thickness of the titanium oxide film is over 50 nm.

* * * * *

UNITED STATES PATENT AND TRADEMARK OFFICE
CERTIFICATE OF CORRECTION

PATENT NO. : 5,766,784
DATED : June 16, 1998
INVENTOR(S) : Suresh Baskaran, et al It is certified that error appears in the above-identified patent and that said Letters Patent is hereby corrected as shown below:

In column 6, line 35, please indent and space off as a heading, the phrase "Molarity ratios and pH requirements to obtain film formation using titanium chelate solutions".

Signed and Sealed this

Twelfth Day of January, 1999

Attest:

Attesting Officer

*Acting Commissioner of Patents and Trademarks*